United States Patent [19]

Lindbeck

[11] 4,338,907

[45] Jul. 13, 1982

[54] GASOLINE FUME GENERATOR AND MIXER

[76] Inventor: Laurel B. Lindbeck, 1466D Rte. #1, Las Cruces, N. Mex. 88001

[21] Appl. No.: 297,382

[22] Filed: Aug. 28, 1981

[51] Int. Cl.³ ............................................ F02M 31/00
[52] U.S. Cl. .................................... 123/557; 123/523; 261/144
[58] Field of Search ............... 123/557, 523, 524, 549; 261/142, 144, 145, DIG. 83

[56] References Cited

U.S. PATENT DOCUMENTS

| | | | |
|---|---|---|---|
| 651,017 | 6/1900 | Navone | 123/523 |
| 781,936 | 2/1905 | Cook | 123/557 |
| 1,465,574 | 8/1923 | Bannister | 123/523 |
| 1,619,894 | 3/1927 | Swartz | 123/523 |
| 2,229,452 | 1/1941 | Hammer . | |
| 2,702,694 | 2/1955 | Featherston . | |
| 3,699,938 | 10/1972 | Frazier . | |
| 3,800,533 | 4/1974 | Zankowski . | |
| 3,854,463 | 12/1974 | Burden, Sr. . | |
| 4,092,963 | 6/1978 | Vrooman | 123/557 |
| 4,106,457 | 8/1978 | Totten | 122/557 |
| 4,108,953 | 8/1978 | Rocco . | |
| 4,196,710 | 4/1980 | Lehar . | |
| 4,211,198 | 7/1980 | Thomas . | |
| 4,267,802 | 5/1981 | Garretson | 123/557 |

*Primary Examiner*—Ronald H. Lazarus
*Attorney, Agent, or Firm*—Jones, Tullar & Cooper

[57] ABSTRACT

A gasoline fume generator and mixer for use with an internal combustion engine is disclosed. Liquid fuel is fed through a metering valve and flows over a hot heat exchange unit which is maintained at a temperature above 200° F. by flow of engine coolant therethrough. The fumes generated by contact of the fuel with the heat exchange unit are mixed with air which is pulled into the generator tank by vacuum. This fume and air mixture is pulled out of the tank and into the carburetor to operate the engine in a conventional manner. A liquid level float actuated flow control device and a flap valve are provided to control the operation of the generator and a clean out plug is provided to allow periodic removal of portions of the liquid fuel which are not turned into fumes by the generator. An optional electric resistance heater is used to elevate the temperature of the liquid fuel entering the generator and mixer when needed, such as in cold weather and quick starts.

10 Claims, 1 Drawing Figure

GASOLINE FUME GENERATOR AND MIXER

FIELD OF THE INVENTION

The present invention is directed generally to a gasoline fume generator and mixer. More particularly, the present invention is directed to a gasoline fume generator for use with an internal combustion engine. Most specifically, the present invention is directed to a gasoline fume generator and mixer wherein the liquid gasoline is heated by contact with hot coolant liquid from an internal combustion engine. The liquid gasoline is fed into the generator tank and is caused to flow downwardly in contact with a heat exchanger coil through which heated engine coolant liquid at a temperature of at least 200° F. is flowing. The gasoline changes from a liquid to fumes and is mixed with air that is pulled into the tank by manifold vacuum. The fumes and air are drawn through a filter and are fed into the carburetor of the vehicle just above the throttle plate. The heat exchanger is in the form of a copper coil and the generator includes cylindrical baffles positioned radially inwardly and outwardly of the coils to define an inner annular flow passage through which the liquid gasoline is caused to flow downardly in contact with the coils in a controlled manner. An electric resistance heating element may be placed in the liquid gasoline infeed line and helps to preheat the gasoline as it flows into the fume generator and mixer.

DESCRIPTION OF THE PRIOR ART

The internal combustion engine is well known and in its normal mode of operation requires a mixture of fuel and air. The fuel is conventionally fed as a liquid to the carburetor where it is mixed with air and is fed through the intake manifold to the cylinders for combustion. Frequently, the fuel and air are not properly mixed so that all the fuel does not change from a liquid to a gas and is therefor not fed to the combustion chambers or is not properly burned in the combustion chamber.

Numerous devices have been proposed to improve engine operation by supplying the fuel either to the carburetor or to the intake manifold as a gas instead of a liquid.

Exemplary of prior patents directed generally to such devices are as follows:

| | |
|---|---|
| 651,071 | Navone |
| 781,936 | Cook |
| 1,619,894 | Swartz |
| 2,229,452 | Hammer et al. |
| 2,702,694 | Featherston |
| 3,699,938 | Frazier |
| 3,800,533 | Zankowski |
| 3,854,463 | Burden, Sr. |
| 4,108,953 | Rocco |
| 4,196,710 | Lehar |
| 4,211,198 | Thomas, Jr. |

A number of these prior art devices have not been completely satisfactory and have therefore not been widely used. Often, they have been unsafe since the liquid fuel has been heated by contact with a hot exhaust manifold or by exposure to other such sources of heat. Suitable controls for the flow of the liquid fuel and the generated vapors have not been incorporated into the devices so that the flow of the fuel has not been properly regulated. The structures of the devices have, in some cases, not been sufficiently strong to properly contain the vapors which have been generated and the prior devices have accordingly not been safe and reliable. Suitable filtering means for the generated gaseous fuel have often not been provided so that the mixture which leaves the generator is not uniform and cannot be burned by the engine in a uniform manner resulting in little or no better mileage.

Thus, the prior art fuel gas generating devices have sometimes been dangerous or unsafe in operation, have not been reliable and dependable, have not generated a gas from a liquid fuel having a uniform particle size and have generally not performed in a satisfactory manner.

SUMMARY OF THE INVENTION

It is an object of the present invention to provide a gasoline fume generator and mixer.

Another object of the present invention is to provide a gasoline fume generator and mixer for use with an internal combustion engine.

A further object of the present invention is to provide a gasoline fume generator and mixer which uses heated engine coolant as the heat main source.

Still another object of the present invention is to provide a gasoline fume generator and mixer which mixes the generated fumes with air.

An additional object of the present invention is to provide a gasoline fume generator and mixer having a fume filter.

Still a further object of the present invention is to provide a gasoline fume generator and mixer having an electric resistance heating element in the liquid gasoline inlet flow line for cold weather or quick starts.

As will be set forth with greater particularity in the description of a preferred embodiment as set forth hereinafter, the gasoline fume generator and mixer in accordance with the present invention is comprised generally of a cylindrical tank. A liquid gasoline line enters the tank adjacent to the bottom and extends upwardly through the middle of the tank to a diffusion orifice. Gasoline flows out through this orifice and down over a spiral heat exchange coil through which hot engine coolant liquid is flowed. The gasoline changes from a liquid to gaseous fumes as it passes down over the heat exchanger coils. These fumes are mixed with air which has been introduced into the bottom of the tank. The fume-air mixture is then fed through a filter which mixes it more and excludes any particles above a certain size. The mixture is then fed into the carburetor of an engine and is used to operate the engine.

The gasoline fume generator in accordance with the present invention utilizes hot engine coolant at a temperature of 200° F. or above plus an electric resistance heater in the incoming liquid fuel line to heat the gasoline sufficiently so that it changes from a liquid to fumes which readily are mixed with air to form a combustable mixture that is used to power the engine. The gasoline fume generator in accordance with the present invention is used as a substitute for the conventional carburetor for the engine. The conventional fuel flow to the carburetor will only be used until the engine coolant temperature reaches a sufficient level.

In contrast to prior art devices, the gasoline fume generator and mixer in accordance with the present invention is a small, rugged, safe, dependable unit which is easily installed in a conventionally powered motor vehicle. The generator mixes the fumes it makes with air in an effective manner to provide a combustable mixture which gives greater mileage while allowing the vehicle to operate in a normal manner. As the gasoline is heated and changes to fumes, a portion is left in the generator and this distillation or purification removes some of the constituents from the gasoline so that emissions are reduced and the engine runs cleaner and is subjected to less wear. Thus, the gasoline fume generator and mixer in accordance with the present invention increases vehicle mileage and engine life while reducing pollution without sacrificing performance.

BRIEF DESCRIPTION OF THE DRAWING

While the novel features of the gasoline fume generator in accordance with the present invention are set forth with particularity in the appended claims, a full and complete understanding of the invention may be had by referring to the description of a preferred embodiment as set forth hereinafter and as may be seen in the accompanying drawing figure in which:

DESCRIPTION OF THE PREFERRED EMBODIMENT

Figure 1:
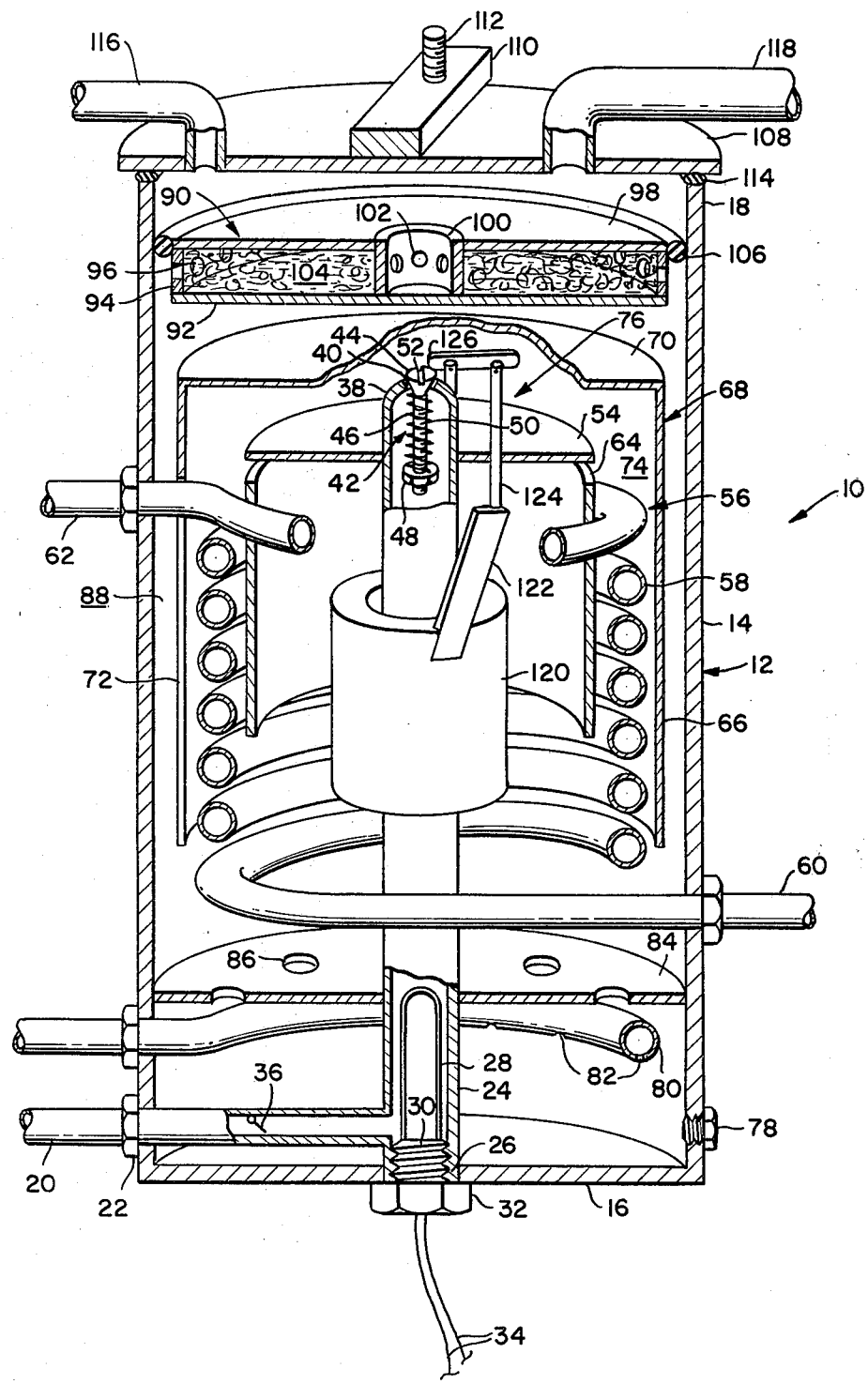
FIG. 1 is a perspective sectional view of the preferred embodiment of the gasoline fume generator and mixer in accordance with the present invention.

Turning now to the drawing FIGURE, there may be seen a continuous gasoline fume generator and mixer in accordance with the present invention generally at 10. As shown in the drawing, gasoline fume generator and mixer 10 is housed in a generally cylindrical tank or vessel 12 having a vertically upstanding side wall 12, and a bottom 16 with the tank 12 being open at its upper end portion and terminating in a upper edge 18. In the preferred embodiment, tank 12 is shown as being cylindrical, having a diameter of 5", a height of 13", and is made of heavy steel. It would be possible to shape tank 12 as a square or rectangle if desired and to use an alternate material so long as it possesses sufficient strength and rigidity or make any necessary changes for manufacturing purposes yet not changing any of the patent features.

A liquid fuel feed line 20 enters the tank 14 adjacent the bottom 16 and is secured to the tank wall 14 by suitable means such as is schematically represented by nut 22. It will be understood that this line and the several other lines which pass into and out of tank 12 are positively sealed and secured by any suitably and conventional manner. Liquid fuel inlet line 20 is joined to a generally vertical liquid fuel riser pipe 24 which has a ¾" diameter and is secured at a first end 26 to the bottom 16 of tank 12 and extends generally vertically upwardly within tank 12 at the center of the tank. An electric resistance heating element 28 is secured in liquid fuel riser 24 at its lower end and is held in place by suitable means such as screw threads 30 and a nut 32. Alternatively, any other suitable means can be used to secure heater 28 in place. Suitable wires 34 supply electric current to heater 28 and may be connected to control means (not shown) which supply current to heater 28 when the fuel temperature entering the fume generator is below a specified level.

Fuel is supplied to line 20 by a conventional fuel pump which usually operates at 3 psi or more. A flap valve 26 is carried in line 20 to prevent back flow of fuel to the pump. The liquid fuel which, in the preferred embodiment is gasoline, is forced up the riser pipe 24 to its upper second end 38 where it exits through an orifice 40 which is controlled by a metering valve 42. In the preferred embodiment, metering valve 42 has a tapered head 44 and an elongated threaded shank 46. A nut 48 is carried by the shank 46 and a spring 50 is held on the shank 46 between nut 48 and the upper end 38 of riser pipe 24. A slot 52 is provided in head 44 of the metering valve 42 so that the opening can be adjusted by rotation of the shank 46 which will either increase or decrease the force exerted by spring 50 thereby controlling the spacing between head 44 and orifice 40.

Liquid fuel which is forced up riser 24 exits through orifice 40, flows down the outer surface of the upper end 38 of riser 24, and flows radially outwardly over the upper surface of a generally disk-shaped diffuser plate 54 which is secured to the liquid fuel riser pipe 24 below its upper end. The liquid fuel flows smoothly outwardly over the diffuser plate 54 and falls downwardly onto a heat exchange unit generally at 56 which is maintained at a temperature of at least 200° F. so that the liquid fuel which contacts the heat exchanger 56 is heated and changes from a liquid to fumes.

Heat exchange unit, generally at 56, is, as may be seen in FIG. 1, a generally spiral continuous length of ½" copper tubing 58. Tubing 58 is carried in tank 12 spaced radially outwardly from riser pipe 24 and is concentric therewith. Heated liquid coolant from the engine enters the heat exchange unit at its lower inlet end 60, flows upwardly through the spiral tubing 58 and exits at an upper exit end 62 from where it is returned to the engine coolant flow system. It will be understood that the diameter of the coils 58 and the number of coils will vary dependant on engine size and fuel flow requirement. The surface area of the coils must be increased as the engine size and hence fuel flow increases. Other arrangement such as double coils and the like may also be used so long as sufficient heat and surface area to turn the liquid fuel into fumes is provided.

The liquid fuel which flows over diffuser plate 54 and down over the heat exchange unit 56 is held in contact with the coils of tubing 58 by an inner sleeve 64 and side wall portion 66 of a hot cap, generally at 68. Inner sleeve 64 is generally cylindrical and has a diameter corresponding to that of diffuser plate 54. This inner sleeve 64 presses against the inner surfaces of tubing 58 and prevents liquid fuel from flowing in a direction other than down over the coils 58 of the heat exchange unit 56. The liquid fuel is also constrained to flow downwardly over the heat exchange unit 56 by the side walls 66 of the hot cap 68. As may be seen in FIG. 1, hot cap 68 is shaped as a cylinder having the side walls 66 and a cover 70. Hot cap 68 also has a slot 72 in the side wall which allows passage of outlet line 62 of heat exchange unit 56 therethrough. Thus, the inner sleeve 64 and the side walls 66 of the hot cap define an inner annular passageway 74 through which the liquid fuel is constrained to flow. The cover 70 of hot cap 68 prevents liquid fuel from being pulled upwardly. The slot 72 in the wall 66 of hot cap 68 is of a suitable length to provide adequate head space above the metering valve 42 for a float actuated flow control device generally at 76.

As the liquid fuel is pumped by the vehicle fuel pump through line 20 into riser 24 and out orifice 40, it is turned into fumes by contact with heat exchanger 56. Any fuel that is not changed into fumes, as may occur during low speed operation of the vehicle, falls to the bottom of the generator tank 12. It will be understood that some components of the fuel will not be turned into fumes by the generator and these components collect in the bottom of the tank 12 where they can be periodically drained away by removal of a drain plug 78 so that the tank can be flushed. An air inlet ring 80 is located near the bottom 16 of tank 12 and serves to introduce air into the generator tank through a plurality of downwardly facing holes 82. Since ring 80 may be below the level of liquid fuel in tank 12, these holes 82 face the bottom of the tank so that they will not become clogged by liquid fuel. A thin horizontal baffle plate 84 is placed in tank 12 above air inlet ring 80 but below the bottom coil 58 of the heat exchanger 56. This baffle plate 84 also has a plurality of spaced holes 86 to allow air to flow therethrough in a smooth, non-turbulent manner.

The air admitted through ring 80 is mixed with the fumes generated in the inner annular space 74 between the inner sleeve 64 and the side wall 66 of the hot cap 68. This mixture then travels up an outer annular passage 88 between the wall 66 of hot cap 68 and the wall 14 of generator tank 12. The mixture of fuel fumes and air is then fed through a filter assembly generally at 90, which filters and mixes any entrained liquid particles above a desired size from the mixture.

Filter 90 is generally disk-shaped and has a solid bottom plate 92, upstanding side walls 94 which have apertures 96, and a top plate 98 which carries a central, downwardly extending baffle ring 100 which also is provided with spaced holes 102. The bottom plate 92 and top plate 98 are spaced from each other by side walls 94 to form a filter chamber 104 which may be filled with a suitable filter medium such as glass fiber or the like. An O-ring seal 106 is placed between the side walls 94 of filter 90 and side walls 14 of tank 12 to ensure a tight seal so that all the generated fume-air mixture passes through the filter 90.

A cover 108 is secured on the upper edge 18 of walls 14 of generator tank 12 and is held in place by any suitable means such as a transverse bar 110 which receives threaded rods 112 that are secured to the outer side wall 14 of tank 12. Suitable wing nuts or the like (not shown) would be used to hold bar 110 in place. An O-ring seal 114 is placed between the upper edge 18 of tank 12 and cover 108 to ensure a good seal. Cover 108 is provided with a hot air inlet 116 which, in the preferred embodiment is a ¼" line that is heated by passing adjacent the exhaust manifold. A fuel mixture discharge line 118 is also provided in cover 108 and is connected to the carburetor of the engine at a point above the throttle plate. In the preferred embodiment, this line is a ¾" line. The fuel air mixture is pulled from the generator 12 through line 118 by the vacuum generated by the engine. The hot air entering through line 116 keeps the discharge line 118 hot and supplements the air drawn in through the air inlet ring 80. A demand regulator (now shown) may be placed in the air-fume line between the generator and the carburetor.

In operation, the engine is started and runs in a conventional manner until the liquid coolant is heated to at least 200° F. At that time suitable controls are actuated to divert the fuel flow from the carburetor to the fume generator 12. The liquid fuel is fed through metering valve 42 and is changed to fumes that are mixed with air which has been pulled in through air inlet ring 80 by suction applied to tank 12 through line 118. Since the vehicle fuel pump is operating at a constant pressure, the metering valve 42 will control fuel flow so that an adequate amount of liquid fuel is constantly supplied to tank 12 to operate the vehicle. If the level of liquid fuel in the tank starts to rise, the flow control device 76 will reduce the fuel flow. A float 120 having an annular cylindrical shape is slideable along the riser 24 in response to liquid fuel levels. A link arm 122 and link rod 124 connect the float 120 to a first end of a valve actuator finger 126 which is pivotally supported adjacent valve head 44. As the liquid fuel level rises, the float 120 will cause finger 126 to depress valve head 44 to reduce liquid fuel flow. Similarly, if the pressure in the tank increases above a certain level; i.e. the pressure against which the fuel pump can operate, the flap valve 36 will prevent flow of liquid into the tank. Thus, the fuel flow is regulated by metering valve 42 and float actuated flow control device 76 and by flap valve 36 to insure safe operation.

In use of a 1973 International Scout with a 304 cubic inch V-8 engine, the fume generator and mixer in accordance with the present invention has been found to operate successfully with adequate power for cruising, passing and the like. The vehicle operates solely on the fume generator supplied fuel air mixture and during substantial testing has been shown to provide significantly improved fuel economy. During a 400 mile test, the vehicle averages 17.3 MPG as compared to 11 MPG without it. Excess generated fumes are stored in the generator tank until such time as they are required by the engine such as, for instance, in passing or acceleration. The float actuated flow control assembly and the flap valve insure that neither liquid fuel levels or pressures are allowed to build up above a pre-determined levels so that the fume generator is safe in operation.

Thus, it may be seen that a preferred embodiment of gasoline fume generator and mixer in accordance with the present invention has been fully and completely described hereinabove. It will be understood, however, that a number of changes in, for example, the shape of the tank, the materials used, the various fastening means, the number and size of the coils in the heat exchanger, the shape of the cover, the cover securement, the size of the tank and the like could be made without departing from the true spirit and scope of the invention and that the invention is to be limited only by the following claims.

I claim:

1. A gasoline fume generator and mixer for use with an internal combustion engine, said fume generator and mixer comprising:

a generator tank having a bottom, side walls and a separable cover;

a liquid riser pipe extending upwardly from said bottom of said tank, said riser pipe being supplied with liquid gasoline at a point adjacent said tank bottom;

a metering valve in an orifice at an upper end of said riser pipe for regulating flow of the gasoline out of said riser pipe;

a heat exchange unit spaced from, and surrounding said riser pipe, said heat exchange unit passing hot liquid coolant from the engine therethrough;

means defining a first annular flow passage for said fuel, said heat exchange unit being positioned in said first annular flow passage, said liquid gasoline contacting said heat exchange unit to generate fumes;

means for supplying air to said tank, said air mixing with said fumes and passing through an outer annular passage to an exit in said cover; and a fume filter interposed between said outer annular passage and said cover, said fumes and air passing through said filter for mixing and removal of entrained liquid particles in said fume and air mixture.

2. The generator and mixer of claim 1 wherein said heat exchange unit is a cylindrical coil of tubing, said liquid coolant flowing into said coils at a lower end and exiting said coils at an upper end.

3. The generator and mixer of claim 1 wherein said liquid gasoline which flows through said metering valve is caused to flow radially outwardly from said riser pipe over a diffuser plate secured to said riser pipe.

4. The generator and mixer of claim 2 wherein said inner annular space is defined by an inner sleeve and side walls of a hot cap, said inner sleeve being placed within said coil of tubing and said hot cap side walls being spaced radially outwardly from said coil.

5. The generator and mixer of claim 4 wherein said hot cap includes a cover which is supported by said hot cap side walls spaced above said metering valve.

6. The fume generator and mixer of claim 1 wherein said air is supplied to said generator tank by an air inlet ring having spaced, downwardly facing air inlet holes, said air ring being positioned near said bottom of said tank and being separated from the remainder of said tank by a perforated baffle plate.

7. The fume generator and mixer in accordance with claim 1 further including a float actuated control for said metering valve, said float actuated control including an annular float slideable along said riser pipe and a valve actuation finger engageable with a head portion of said metering valve to regulate gasoline flow through said metering valve as said float is caused to move in said tank by accumulated liquid gasoline in said tank.

8. The generator and mixer of claim 1 wherein said fume filter includes a bottom plate and a top plate spaced from each other to define a filter chamber.

9. The generator and mixer of claim 1 further including an electric resistance heater in said riser pipe at a lower end of said riser pipe.

10. The generator and mixer of claim 1 wherein said metering adjustable valve has a tapered head and an elongated shank, said shank carrying a spring which urges said valve to a closed set position.

* * * * *